United States Patent
Watanobe et al.

(10) Patent No.: US 12,030,143 B2
(45) Date of Patent: Jul. 9, 2024

(54) METHOD FOR MANUFACTURING A CUTTING TOOL, AND THE CUTTING TOOL

(71) Applicant: SUMITOMO ELECTRIC HARDMETAL CORP., Hyogo (JP)

(72) Inventors: Naoki Watanobe, Hyogo (JP); Gaku Harada, Hyogo (JP); Satoru Kukino, Hyogo (JP)

(73) Assignee: SUMITOMO ELECTRIC HARDMETAL CORP., Hyogo (JP)

(*) Notice: Subject to any disclaimer, the term of this patent is extended or adjusted under 35 U.S.C. 154(b) by 0 days.

(21) Appl. No.: 17/630,054

(22) PCT Filed: Jul. 1, 2020

(86) PCT No.: PCT/JP2020/025745
§ 371 (c)(1),
(2) Date: Jan. 25, 2022

(87) PCT Pub. No.: WO2021/020007
PCT Pub. Date: Feb. 4, 2021

(65) Prior Publication Data
US 2022/0266400 A1 Aug. 25, 2022

(30) Foreign Application Priority Data
Aug. 1, 2019 (JP) .................... 2019-142400

(51) Int. Cl.
*B23P 15/28* (2006.01)
*B23B 27/20* (2006.01)
*B23K 26/361* (2014.01)

(52) U.S. Cl.
CPC .............. *B23P 15/28* (2013.01); *B23B 27/20* (2013.01); *B23K 26/361* (2015.10)

(58) Field of Classification Search
CPC .................... B23B 27/20; B23P 15/28
(Continued)

(56) References Cited

U.S. PATENT DOCUMENTS 5,483,038 A * 1/1996 Ota .................. B28D 1/221
219/121.73
6,187,421 B1 * 2/2001 Moriguchi ............ C23C 28/044
51/307
(Continued)

FOREIGN PATENT DOCUMENTS

CN 104440004 A 3/2015
CN 107127459 A 9/2017
(Continued)

*Primary Examiner* — Jimmy Chou
(74) *Attorney, Agent, or Firm* — Renner, Otto, Boisselle & Sklar, LLP (57) ABSTRACT

A method for manufacturing a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, the method comprising producing and processing the flank face with a laser, the producing and processing being producing and processing the cutting edge region along the ridge line of the edge with a first laser beam having a depth of focus equal to or deeper than a width of the cutting edge region when the distance X is the width of the cutting edge region, the distance X being 0.2 mm or more and 5 mm or less.

1 Claim, 3 Drawing Sheets

(58) Field of Classification Search
USPC .......................................................... 75/115
See application file for complete search history.

(56) References Cited

U.S. PATENT DOCUMENTS

| | | | | |
|---|---|---|---|---|
| D664,168 S | * | 7/2012 | Okamura | D15/139 |
| D787,578 S | * | 5/2017 | Watanobe | D15/139 |
| 11,376,668 B2 | * | 7/2022 | Kobayashi | B23C 5/10 |
| 2002/0190105 A1 | * | 12/2002 | Kanada | C04B 41/009 |
| | | | | 228/248.1 |
| 2008/0025802 A1 | * | 1/2008 | Kukino | B23B 27/145 |
| | | | | 419/13 |
| 2008/0193724 A1 | * | 8/2008 | Okamura | C04B 41/5068 |
| | | | | 427/249.7 |
| 2008/0253849 A1 | * | 10/2008 | Yoshinaga | B23B 27/20 |
| | | | | 407/119 |
| 2008/0254282 A1 | * | 10/2008 | Kukino | C04B 41/009 |
| | | | | 428/336 |
| 2008/0286558 A1 | * | 11/2008 | Kukino | C23C 14/0664 |
| | | | | 428/323 |
| 2008/0292415 A1 | * | 11/2008 | Kuroda | B23B 27/145 |
| | | | | 83/53 |
| 2009/0130434 A1 | * | 5/2009 | Zhu | C04B 35/58014 |
| | | | | 407/119 |
| 2009/0208301 A1 | * | 8/2009 | Kuroda | B23B 27/14 |
| | | | | 428/218 |
| 2009/0211414 A1 | * | 8/2009 | Fukano | B23B 27/141 |
| | | | | 83/13 |
| 2012/0012563 A1 | * | 1/2012 | Fang | C30B 29/08 |
| | | | | 219/121.18 |
| 2012/0213601 A1 | * | 8/2012 | Setoyama | B23B 27/141 |
| | | | | 407/115 |
| 2013/0200052 A1 | * | 8/2013 | Wittwer | B23K 26/0876 |
| | | | | 219/121.75 |
| 2013/0256285 A1 | * | 10/2013 | Baxter | B23K 26/048 |
| | | | | 219/121.72 |
| 2013/0260165 A1 | * | 10/2013 | Kobayashi | C04B 35/6303 |
| | | | | 428/564 |
| 2013/0291446 A1 | * | 11/2013 | Kukino | C04B 35/645 |
| | | | | 51/307 |
| 2013/0292188 A1 | * | 11/2013 | Bilen | E21B 10/567 |
| | | | | 175/428 |
| 2014/0026492 A1 | * | 1/2014 | Tatsumi | C04B 35/52 |
| | | | | 51/307 |
| 2014/0090515 A1 | * | 4/2014 | Gruhler | B23K 26/0869 |
| | | | | 219/121.72 |
| 2015/0016902 A1 | * | 1/2015 | Okamura | B23B 27/148 |
| | | | | 407/116 |
| 2015/0060421 A1 | * | 3/2015 | Tami | B23K 26/0853 |
| | | | | 219/121.77 |
| 2015/0202730 A1 | * | 7/2015 | Watanobe | B23B 27/18 |
| | | | | 451/28 |
| 2015/0239050 A1 | * | 8/2015 | Hirano | B22F 7/062 |
| | | | | 407/115 |
| 2015/0274533 A1 | * | 10/2015 | Arimoto | C01B 32/26 |
| | | | | 428/408 |
| 2016/0001397 A1 | * | 1/2016 | Eun | B23K 26/0624 |
| | | | | 219/121.62 |
| 2016/0175951 A1 | * | 6/2016 | Kneisley | B23D 35/001 |
| | | | | 83/651 |
| 2016/0243624 A1 | * | 8/2016 | Tomoda | B23B 27/22 |
| 2016/0250691 A1 | * | 9/2016 | McClymont | C23C 16/01 |
| | | | | 29/557 |
| 2016/0297010 A1 | * | 10/2016 | Kukino | B24B 3/34 |
| 2016/0311030 A1 | * | 10/2016 | Kondameedi | B23B 27/145 |
| 2017/0072474 A1 | * | 3/2017 | Minami | B27B 33/02 |
| 2017/0266733 A1 | * | 9/2017 | Sato | C23C 14/325 |
| 2017/0320144 A1 | * | 11/2017 | Nishibayashi | C23C 14/0641 |
| 2018/0087149 A1 | * | 3/2018 | Matsuo | C23C 14/221 |
| 2018/0161886 A1 | * | 6/2018 | Hasegawa | C23C 14/0664 |
| 2019/0001423 A1 | * | 1/2019 | Matsuda | B23C 5/10 |
| 2019/0054544 A1 | * | 2/2019 | Harada | B23C 5/16 |
| 2019/0054545 A1 | * | 2/2019 | Harada | B23B 27/20 |
| 2019/0134721 A1 | | 5/2019 | Waki | |
| 2019/0143419 A1 | * | 5/2019 | Shimanuki | B23B 27/045 |
| | | | | 82/123 |
| 2019/0276922 A1 | * | 9/2019 | Takahama | C10M 171/02 |
| 2019/0299297 A1 | * | 10/2019 | Austin | B23B 27/20 |
| 2020/0030889 A1 | * | 1/2020 | Harada | B23K 26/53 |
| 2020/0215618 A1 | * | 7/2020 | Hirano | B23C 5/28 |
| 2020/0261985 A1 | * | 8/2020 | Kubo | C23C 16/279 |
| 2020/0269366 A1 | * | 8/2020 | Shamoto | B23K 26/082 |
| 2020/0361005 A1 | * | 11/2020 | Tsukihara | C23C 30/005 |
| 2021/0178489 A1 | * | 6/2021 | Shamoto | C23C 30/005 |
| 2022/0274186 A1 | * | 9/2022 | Ueda | B23P 15/28 |
| 2022/0305563 A1 | * | 9/2022 | Shamoto | B23B 27/20 |

FOREIGN PATENT DOCUMENTS

| | | |
|---|---|---|
| JP | 2557560 B2 | 11/1996 |
| JP | 2005-007531 A | 1/2005 |
| JP | 2005-238357 A | 9/2005 |
| JP | 2012-161873 A | 8/2012 |
| JP | 2014-046439 A | 3/2014 |
| JP | 2015-051445 A | 3/2015 |
| JP | 2016-203372 A | 12/2016 |
| JP | WO2017/188154 A1 | 2/2019 |
| JP | 2019048361 A * | 3/2019 |

* cited by examiner

METHOD FOR MANUFACTURING A CUTTING TOOL, AND THE CUTTING TOOL

TECHNICAL FIELD

The present disclosure relates to a method for manufacturing a cutting tool, and the cutting tool. The present application claims priority based on Japanese Patent Application No. 2019-142400 filed on Aug. 1, 2019. The entire contents of the description in this Japanese patent application are incorporated herein by reference.

BACKEROUND ART

In manufacturing and processing a cutting tool using a material such as polycrystalline diamond (hereinafter also referred to as "PCD"), single-crystal diamond (hereinafter also referred to as "SCD"), or binderless cubic boron nitride (cBN) (hereinafter also referred to as "BLCBN"), when a grinding process using a grinding wheel is applied, a long period of time is required for the process, and a defect (hereinafter also referred to as "chipping") is frequently caused at an edge on a ridge line interconnecting a rake face and a flank face. Further, PCD, SCD and BLCBN are insulators, and electric discharge machining cannot be applied to process these. In this regard, for example, Japanese Patent Laid-Open No. 2016-203372 (PTL 1) proposes manufacturing and processing a cutting tool of this type by using a laser to achieve a reduced processing time and reduced chipping.

CITATION LIST

Patent Literature

PTL 1 Japanese Patent Laid-Open No. 2016-203372

SUMMARY OF INVENTION

The presently disclosed method for manufa.cturing a cutting tool is a method for manufacturing a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, the method comprising producing and processing the flank face with a laser, the producing and processing being producing and processing the cutting edge region along the ridge line of the edge with a first laser beam having a depth of focus equal to or deeper than a width of the cutting edge region when distance X is the width of the cutting edge region, distance X being 0.2 mm or more and 5 mm or less.

The presently disclosed cutting tool is a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, distance X being 0.2 mm or more and 5 mm or less, the cutting edge region having a surface roughness, as represented by an arithmetic mean roughness Ra, of 0.2 μm or less, the edge having the ridge line without chipping of 5 μm or more in size.

DETAILED DESCRIPTION

Problem to be Solved By the Present Disclosure

A cutting tool using materials such as PCD, SCD, and BLCBN is often applied to so-called mirror finish to extremely reduce a workpiece in surface roughness. Therefore, when the cutting tool is manufactured by using a laser, it is required to be processed so that it has an edge portion which has a shape of a sharp edge required for finishing a surface of a workpiece to be a mirror surface and has a level of strength to keep the shape of the sharp edge while the cutting tool cuts the workpiece. Further, the cutting tool is also required to be manufactured so that the edge portion obtains a surface roughness that enables mirror-finishing.

Figure 1:
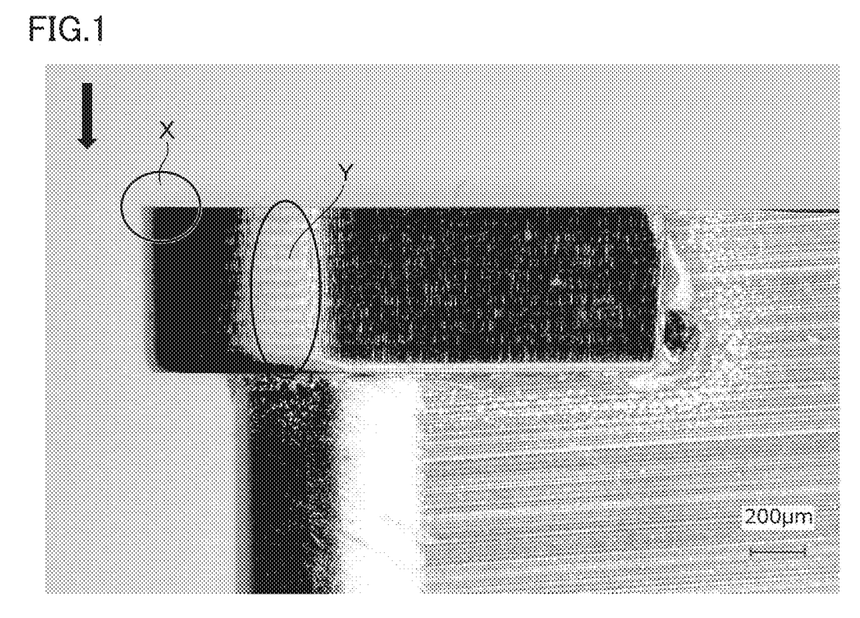
FIG. 1 is a photograph as a substitute for a drawing for illustrating a round shape of an edge formed through an unnecessary manufacturing process and a feed mark in a cutting edge region on a flank fa.ce of a CVD single-crystal diamond tool (Comparative Example 1) manufactured with a laser having a shallow depth of focus.

When a cutting tool is manufactured using a laser, a laser beam having a shallow depth of focus is generally used. A reason for this is to avoid unnecessarily processing a cutting tool such as a multi-blade tool having a complicated shape for example, as a portion which is not intended to be processed is within the depth of focus of the laser beam. However, when a cutting tool is manufactured using a laser beam having a shallow depth of focus, unintended processing is performed in some cases as the edge is partially exposed to the laser beam in the vicinity of the focal point of the laser beam, For example, as shown in FIG. 1, there has been a case with a cutting edge region having an edge rounded (hereinafter also referred to as a "round shape") (see an encircled portion X in FIG. 1, An arrow in FIG. 1 indicates a direction in which the laser beam is emitted). That is, when a laser beam having a shallow depth of focus is used to process the cutting edge region, the linearity of the cutting edge region appearing as a line in a cross section in a direction parallel to the widthwise direction of the flank face (in FIG. 1, the vertical direction) (hereinafter also simply referred to as "the linearity of the cutting edge region") may be deteriorated, and an edge having a round shape as shown in FIG. 1 may be formed in the cutting edge region.

Further, when a laser beam having a shallow depth of focus is used to process the cutting edge region, a machining mark (a so-called feed mark) formed along a contour line of the depth of focus of the laser beam remains in the cutting edge region after the process, and due to the feed mark, a desired surface roughness may occasionally not be obtained (see an encircled portion Y in FIG. 1). Therefore, a cutting tool having a cutting edge region which has no feed mark formed thereon and is also improved in linearity has not yet been obtained through a manufacturing process using a laser, and there is a great need for development thereof.

In view of the above, an object of the present disclosure is to provide a method through a process using a laser for manufacturing to obtain a cutting tool having a cutting edge region which has no feed mark formed thereon and is also improved in linearity, and the cutting tool Obtained in that method.

Advantageous Effect of the Present Disclosure

In view of the above, there can be provided a method through a process using a laser for manufacturing to obtain a cutting tool having a cutting edge region which has no feed mark formed thereon and is also improved in linearity.

Description of Embodiments of the Present Disclosure

First, embodiments of the present disclosure will he specified and described.

[1] In one aspect of the present disclosure, a method for manufacturing a cutting tool is a method for manufacturing a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, the method comprising producing and processing the flank face with a laser, the producing and processing being producing and processing the cutting edge region along the ridge line of the edge with a first laser beam having a depth of focus equal to or deeper than a width of the cutting edge region when distance X is the width of the cutting edge region, distance X being 0.2 mm or more and 5 mm or less. The method for manufacturing a cutting tool that has such a feature can provide a cutting tool having a cutting edge region which has no feed mark formed thereon and is also improved in linearity.

[2] Preferably, the producing and processing the flank face with the laser further includes finishing the cutting edge region with a second laser beam having a depth of focus shallower than the depth of focus of the first laser beam. A cutting tool having a cutting edge region further smaller in surface roughness can be obtained.

[3] Preferably, the first laser beam is an interference laser beam in which first-order light and second-order light coaxially overlap and interfere with each other, the first-order light is emitted from one or more light sources and has a focal point position on a first focal plane, the second-order light has a focal point position on a second focal plane farther from the one or more light sources than the first focal plane, and the interference laser beam has between the first focal plane and the second focal plane a third focal plane in which the interference laser beam has a uniform cross-sectional intensity distribution. This can facilitate forming a first laser beam having small variation in cross-sectional intensity before and after a focal point position and having a depth of focus equal to or deeper than the width of the cutting edge region, and hence help to provide a cutting tool having a cutting edge region which has no feed mark formed thereon and is also improved in linearity.

[4] Preferably, the first laser beam is a laser beam passing through a condensing optical system including a first optical unit having a condensing function and a second optical unit having a spherical aberration generating function, the condensing optical system satisfying a relationship of the following expressions a and b:

$$|Z_8| \geq 0.1\lambda \text{ or } |Z_{15}| \geq 0.05\lambda \text{ and} \qquad a$$

$$Z_8/Z_{15} \geq 3 \text{ or } Z_8/Z_{15} < 1, \qquad b$$

where $\lambda$ represents wavelength, $Z_8$ is an eighth one of coefficients of a zernike fringe polynomial for wave aberration and represents a third-order spherical aberration, and $Z_{15}$ is a fifteenth one of coefficients of the zernike fringe polynomial for wave aberration and represents a fifth-order spherical aberration.

This can facilitate forming a first laser beam having a depth of focus equal to or deeper han the width of the cutting edge region, and hence help to provide a cutting tool having a cutting edge region which has no feed mark formed thereon and is also improved in linearity.

[5] The cutting tool is preferably a nano-polycrystalline diamond tool. Thus, a cutting tool using nano-polycrystalline diamond as a material can be manufactured having a cutting edge region which has no feed mark formed thereon and is also improved in linearity.

[6] The cutting tool is preferably a single-crystal diamond tool. Thus, a cutting tool using single-crystal diamond as a material can be manufactured having a cutting edge region which has no feed mark formed thereon and is also improved in linearity.

[7] The cutting tool is preferably a binderless cBN tool. Thus, a cutting tool using binderless cBN as a material can be manufactured having a cutting edge region which has no feed mark formed thereon and is also improved in linearity.

[8] In one aspect of the present disclosure, a cutting tool is a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, distance X being 0.2 mm or more and 5 mm or less, the cutting edge region having a surface roughness, as represented by an arithmetic mean roughness Ra, of 0.2 μm or less, the edge having the ridge line without chipping of 5 μm or more in size. The cutting tool that has such a feature has a cutting edge region which has no feed mark formed thereon and is also improved in linearity, and the cutting tool is thus suitable for mirror-finishing.

Detailed Description of Embodiments of the Present Disclosure

Hereinafter, an embodiment of the present disclosure (hereinafter also referred to as "the present embodiment") will be described. In the present specification, an expression in the form of "A to B" means a range's upper and lower limits (that is, A or more and B or less), and when A is not accompanied by any unit and B is alone accompanied by a unit, A has the same unit as B. Furthermore, in the present specification, when a compound or the like is represented by a chemical formula without specifying any specific atomic ratio, it includes any conventionally known atomic ratio and is not necessarily limited to what falls within a stoichiometric range.

[Method for M.anufa.cturing a Cutting Tool]

A method for manufacturing a cutting tool according to the present embodiment is a method for manufacturing a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X. The method for manufacturing a cutting tool comprises producing and processing the flank face with a laser. The producing and processing the flank face with a laser is producing and processing the cutting edge region along the ridge line of the edge with a first laser beam having a depth of focus equal to or deeper than a width of the cutting edge region when distance X is the width of the cutting edge region. The method for manufacturing a cutting tool that has such a feature can provide a cutting tool having a cutting edge region which has no feed mark formed thereon and is also improved in linearity.

The "cutting edge region on the flank face" (hereinafter also simply referred to as the "cutting edge region") means a region defined by a length along an edge's ridge line interconnecting a rake face and the flank face and a width from the ridge line of the edge to a point A away therefrom on the side of the flank face by a distance X (specifically, 0.2 mm or more and 5 mm or less) Further, while the "ridge line of the edge" means a ridge (a sharp edge) at which the rake face and the flank face meet each other, a round shape appearing when the ridge is observed in an enlarged view will also be regarded as the "ridge line of the edge" insofar as it exhibits an effect of the present disclosure.

In the course of developing a method using a laser in a manufacturing process for manufacturing a cutting tool having a cutting edge region which has no feed mark formed thereon and is also improved in linearity, as defined as above, the present inventors have noted a laser beam having a depth of focus deeper than a conventional laser beam used in a process for manufacturing this type of cutting tool. Specifically, the present inventors have arrived at producing and processing the cutting edge region along the ridge line of the edge by using a first laser beam having a depth of focus equal to or deeper than the width of the cutting edge region.

This can eliminate the necessity of moving the laser beam in the widthwise direction of the cutting edge region in producing and processing the cutting edge region and thus prevent a feed mark from being formed on the cutting edge region. Further, the cutting edge region in the widthwise direction is entirely within a deep depth of focus of a single laser beam, which can prevent the cutting edge region from having an edge (that is, a ridge line of an edge or the like) formed in a round shape. This can improve the cutting edge region in linearity.

In the present specification, a "depth of focus" means a depth in a direction in which a laser travels, that allows the laser to process a workpiece (i.e., a cutting tool) before and after the laser beam's focal point. Therefore, in the present specification, a "deep depth of focus" means that a depth in a direction in which a laser travels, that allows the laser to process a workpiece, is a large depth. In the present specification, whether a "depth of focus" is deep or shallow is distinguished with 0.2 mm serving as a boundary, and a depth of focus having a depth of 0.2 mm or more is referred to as a "deep depth of focus," and a depth of focus having a depth of less than 0.2 mm is referred to as a "shallow depth of focus". When a laser beam has a deep depth of focus, the cutting edge region in the widthwise direction can entirely be within that depth of focus, and thus the cutting edge region can be free of a feed mark formed thereon and can also be improved in linearity. Generally, a deep depth of focus can be obtained by passing a laser beam through a long lens or the like having a long focal length.

As will be indicated hereinafter in an example, the method for manufacturing a cutting tool according to the present embodiment allows a cutting tool to be produced and processed by using under a predetermined condition a first laser beam having a depth of focus (2 mm) deeper than the width of the cutting edge region on the flank face of the cutting tool. Specifically, in order to manufacture a cutting tool comprising a core portion made of cemented carbide and an edge portion made of single-crystal diamond produced through chemical vapor deposition (CVD) (hereinafter also referred to as "CND single-crystal diamond"), a first laser beam is used to produce and process the edge portion. As a result, a cutting edge region having a width of 1 mm on the flank face included in the edge portion can be produced and processed without forming a feed mark, In this case, the cutting edge region is also improved in linearity. Note that an "edge portion" in the cutting tool as referred to herein means a portion of the cutting tool that is held on the core portion by means such as brazing and functions as a cutting edge to cut a workpiece directly, and specifically, it refers to a portion including a rake face, a flank face, and an edge having a ridge line interconnecting the rake face and the flank face.

Such a cutting tool can be obtained in a method for manufacturing a cutting tool that includes producing and processing a flank face with a laser, as will be described hereinafter. Hereinafter, as an example of a method for manufacturing a cutting tool according to the present embodiment will be described a method for manufacturing a cutting tool that comprises: producing and processing a flank face with a laser, as described above, and together therewith; preparing a cutting tool precursor which undergoes the step of producing and processing a flank face with a laser; and preparing a laser apparatus used in the step of producing and processing a flank face with a laser.

Preparing a Cutting Tool Precursor

In this step, a cutting tool precursor which undergoes the step of producing and processing a flank face with a laser is prepared. Such a cutting tool precursor can be prepared through a conventionally known process using a material such as polycrystalline diamond (PCD), single-ctystal diamond (SCD), binderless cBN (BLCBN), or the like. For example, PCD, SCD or BLCBN formed into a predetermined tool shape can be used as the cutting tool precursor. Further, it is also possible to use a cutting tool precursor having a core portion made of cemented carbide or the like and an edge portion made of PCD, SCD, or BLCBN held on the core portion by means of brazing or the like.

Preparing a Laser Apparatus

In this step, a laser apparatus used in the step of producing and processing a. flank face with a laser is prepared. The laser apparatus preferably comprises at least one of an optical component for forming an interference laser beam and a condensing optical system, as will be described hereinafter. in other words, the laser apparatus preferably comprises a laser medium and a laser resonator including the laser medium, and at least one of an optical component and a condensing optical system as will be described hereinafter. As the laser medium included in the laser apparatus and the laser resonator including the laser medium can be those conventionally known in the art. The laser medium can for example be neodymium, YAG, YVO4, or the like.

Producing and Processing Flank Face with Laser

In this step, when distance X (a distance from the ridge line of the edge to a point A away therefrom on the side of the flank face by 0.2 mm or more and 5 mm or less) is the width of the cutting edge region, the cutting edge region is produced and processed along the ridge line of the edge with a first laser beam having a depth of focus equal to or deeper than the width. Thus, the cutting edge region can be produced and processed while the cutting edge region in the widthwise direction is entirely within a single deep depth of focus of the first laser beam. Therefore, in this step, moving the first laser beam only in a direction along the ridge line of the edge suffices, and moving the first laser beam in the widthwise direction of the cutting edge region can be dispensed with.

First Laser Beam

The first laser beam has a depth of focus equal to or deeper than the width of the cutting edge region, as discussed above. The width of the cutting edge region can be represented by distance X, and specifically, distance X is 0.2 mm or more and 5 mm or less. Therefore, depending on the width of the cutting edge region, the first laser beam preferably has a depth of focus having a depth for example of 0.3 mm or more and 5 mm or less, more preferably 1 mm or more and 5 mm or less. Such a first laser beam can be easily obtained by the laser apparatus prepared in the step of preparing the laser apparatus. That is, the first laser beam having a depth of focus equal to or deeper than the width of the cutting edge region can be easily formed by a laser apparatus comprising an optical component for forming an interference laser beam described hereinafter or a laser apparatus comprising a condensing optical system described hereinafter.

Interference Laser Beam

The first laser beam is preferably an interference laser beam in which first-order light and second-order light coaxially overlap and interfere with each other. The first-order light is emitted from one or more light sources and has a focal point position on a first focal plane. The second-order light has a focal point position on a second focal plane farther from the one or more light sources than the first focal plane. The interference laser beam has between the first focal plane and the second focal plane a third focal plane in which the interference laser beam has a uniform cross-sectional intensity distribution. Thus, the first laser beam has small variation in cross-sectional intensity before and after the focal point position (that is, a range from the first focal plane to the second focal plane through the third focal plane), and a deep depth of focus can be obtained.

Figure 2:
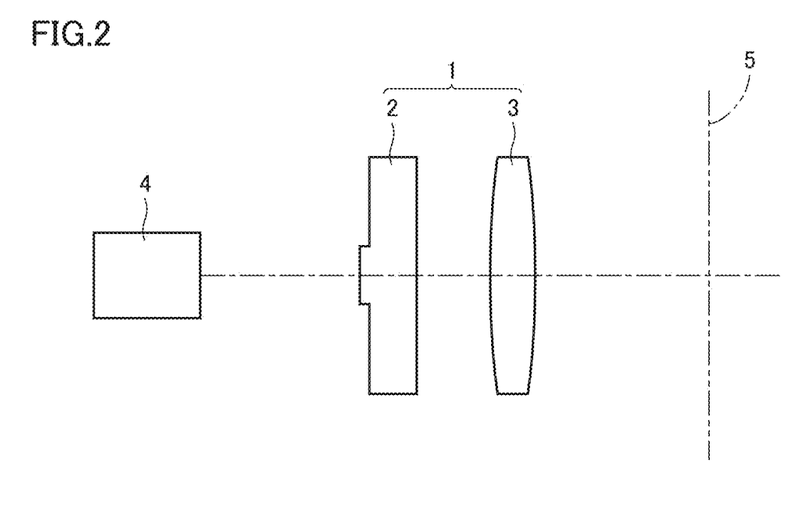
FIG. 2 is a diagram for illustrating a feature of a laser apparatus including an optical component for forming an interference laser beam exemplified as a first laser beam.
Figure 3:
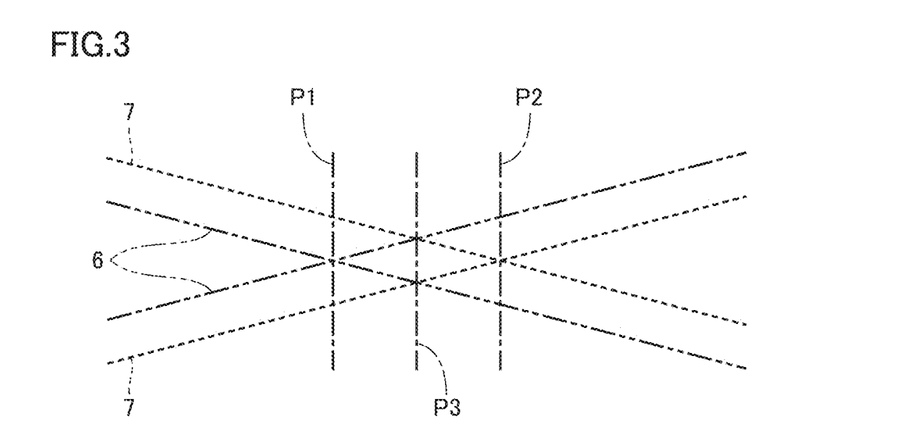
FIG. 3 is a diagram for illustrating an interference laser beam formed by interference of first-order light and second-order light having different focal point positions.

Although the first laser beam (the interference laser beam) should not be particularly limited, it is convenient to form the laser beam by using, for example, a laser apparatus including an optical component as shown in FIG. 2. Thus, the first laser beam can be obtained as an interference laser beam as shown in FIG. 3. Hereinafter, a structure of the optical component will be described.

As shown in FIG. 2, in the laser apparatus, an optical component 1 includes a diffractive optical element 2 serving as a light generating unit and a convex lens 3 serving as a condensing unit. Diffractive optical element 2 and convex lens 3 are disposed on the laser emitting side of laser resonator 4 serving as a light source emitting a laser beam such that the laser beam's optical axis is coaxial with the central axis of diffractive optical element 2 and convex lens 3. Thus, the laser apparatus including optical component 1 can form a focal plane 5 in which the interference laser beam has a uniform cross-sectional intensity distribution on a side opposite to laser resonator 4 with diffractive optical element 2 and convex lens 3 interposed therebetween. Focal plane 5 corresponds to the third focal plane of the interference laser beam located between the first focal plane and the second focal plane.

Laser resonator 4 emits a laser beam, which passes through diffractive optical element 2 and convex lens 3 to be an interference laser beam. Specifically, diffractive optical element 2 receives a laser beam emitted from laser resonator 4 and converts the laser beam into two diffractions of light having different focal point positions. More specifically, as shown in FIG. 3, diffractive optical element 2 receives the laser beam emitted from laser resonator 4 and converts the laser beam into first-order light 6 having a focal point position on a first focal plane P1 and second-order light 7 having a focal point position on a second focal plane P2 farther from the laser resonator than first focal plane P1. First-order light 6 and second-order light 7 obtained through conversion by diffractive optical element 2 are coaxially superimposed by the convex lens to be an interference laser beam. The interference laser beam has a third focal plane P3 (focal plane 5 in FIG. 2) located between first focal plane P1 and second focal plane P2, and has a substantially uniform cross-sectional intensity distribution in third focal plane P3 in the vicinity of the central axis (or optical axis) of the beam.

Diffractive optical element 2 is in the form of a disc and has a round convex portion formed on a surface thereof facing laser resonator 4. The laser beam emitted from laser resonator 4 becomes positive first-order diffracted light and negative first-order diffracted light having different angles of divergence at the convex portion of diffractive optical element 2, and two laser beams (first-order light and second-order light) having different focal point positions are thus generated. The convex portion of diffractive optical element 2 is set in height to a height that provides a phase difference $\pi$ (radian). The convex portion has a diameter selected based on a beam diameter D of the laser beam emitted to diffractive optical element 2, and specifically, selected within a range of 0.9 to 1.3 times beam diameter D of the laser beam, preferably set to 1.2 times beam diameter D of the laser beam. Diffractive optical element 2 can be selected in diameter and thickness, as appropriate, depending on beam diameter D of the laser beam emitted to diffractive optical element 2. For example, diffractive optical element 2. may have a diameter of 20 to 50 mm, and a thickness of 3 to 5 mm.

The convex portion of diffractive optical element 2 is not limited in shape to a circle and may for example be a square convex portion. Diffractive optical element 2 can have the convex portion replaced with a concave portion providing phase difference $\pi$. Further, diffractive optical element 2 can have the square convex portion replaced with a square concave portion which provides phase difference $\pi$. The laser beam's cross sectional shape is not necessarily circular, and, depending on the laser beam's distortion, the circular or square convex or concave portion may be changed in shape to an elliptical or rectangular convex or concave portion.

Optical component 1 may have diffractive optical element 2 and convex lens 3 disposed such that on the side of laser resonator 4, convex lens 3 is disposed, followed by diffractive optical element 2. The above-described interference laser beam can be formed by using, for example, an optical component for a laser described in Japanese Patent No. 5633849.

Condensing Optical System

Further, the first laser beam is preferably a laser beam having passed through a condensing optical system including a first optical unit having a condensing function and a second optical unit having a spherical aberration generating function, the condensing optical system satisfying a relationship of the following expressions a and b:

$$|Z_8| \geq 0.1\lambda \text{ or } |Z_{15}| \geq 0.05\lambda \text{ and} \qquad \text{a}$$

$$Z_8/Z_{15} \geq 3 \text{ or } Z_8/Z_{15} < 1, \qquad \text{b}$$

where $\lambda$ represents wavelength, $Z_8$ is an eighth one of coefficients of a zernike fringe polynomial for wave aberration and represents a third-order spherical aberration, and $Z_{15}$ is a fifteenth one of coefficients of the zernike fringe polynomial for wave aberration and represents a fifth-order spherical aberration.

The laser beam having passed through the condensing optical system satisfying the relationship of the above expressions a and b neither causes an intermittent cross-sectional intensity distribution before and after the focal point nor is decreased in intensity at the focal point position. Therdore, the laser beam can be obtained as the first laser beam having a deep depth of focus. Thus, the first laser beam having a depth of focus equal to or deeper than the width of the cutting edge region can be easily formed by the condensing optical system.

Figure 4:
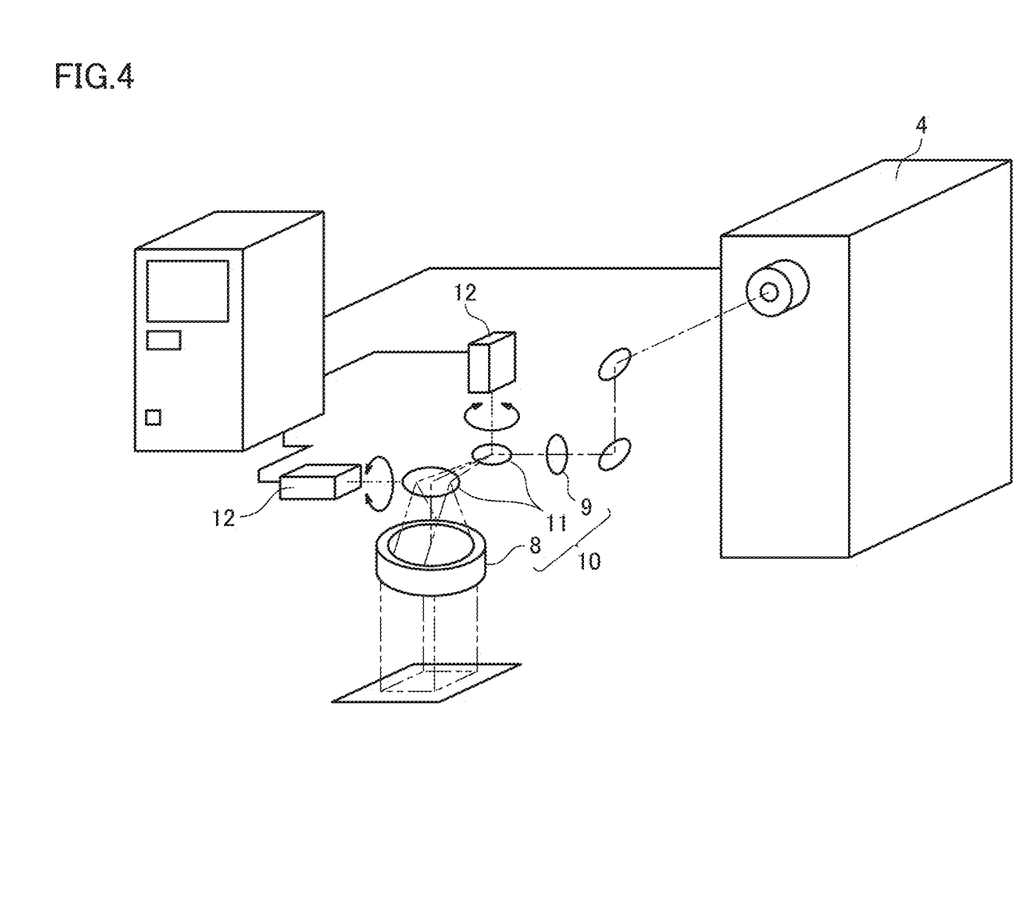
FIG. 4 is a diagram for illustrating a feature of a laser apparatus including a condensing optical system for obtaining the first laser beam.

FIG. 4 is a diagram for illustrating a feature of the laser apparatus including the condensing optical system for obtaining the first laser beam, As shown in FIG. 4, condensing optical system 10 includes a first optical unit having a condensing function and a second optical unit having a spherical aberration generating function. In addition, it may include a pair of galvano mirrors 11 having a function to polarize a laser beam and a galvano scanner 12 to drive the pair of galvano mirrors 11. The first optical unit can for example be an fθ lens 8. The second optical unit can for example be an aspherical phase plate 9. Alternatively, the second optical unit can be a diffractive phase plate.

When condensing optical system 10 is mounted in the laser apparatus, for example, with reference to FIG. 4, laser resonator 4 emits a laser beam which is in turn changed in in which direction the laser beam travels by two bent mirrors provided in the vicinity of laser resonator 4, and subsequently, the laser beam first passes through the second optical unit or aspherical phase plate 9 and thus causes spherical aberration. Further, the laser beam is deflected at a predetermined deflection angle by the two galvano mirrors 11 and guided to the first optical unit or fθ lens 8. Subsequently., the laser beam deflected by galvano mirrors 11 at the predetermined deflection angle and thus on and out of the optical axis is made parallel to the optical axis through fθ lens 8 and will thus be condensed at a processing position of a workpiece.

Condensing optical system 10 satisfies at aspherical phase plate 9 a relationship of at least one of $Z_8$ having an absolute value of 0.1$\lambda$ or more and $Z_{15}$ having an absolute value of 0.05$\lambda$ or more, and a relationship of at least one of $Z_8/Z_{15}$, having a value of 3 or more or $Z_8/Z_{15}$ having a value less than 1, as defined as above. Thus, the laser beam having passed through condensing optical system 10 (i.e., the first laser beam) can obtain a deep depth of focus.

Further, it is preferable that condensing optical system 10 satisfy at aspherical phase plate 9 a relationship of at least one of $Z_8$ having an absolute value of less than 1.4$\lambda$ and $Z_{15}$ having an absolute value of less than 0.5$\lambda$. Thus, the laser beam (or the first laser beam) having passed through condensing optical system 10 can maintain the intensity of the laser beam at the focal point position as the laser beam passes through aspherical phase plate 9. That is, from the viewpoint of maintaining the intensity of the laser beam at the focal point position, it is more preferable that the condensing optical system satisfy at least one of the following expressions c and d:

$$|Z_8| < 1.4\lambda \text{ and} \qquad \text{c}$$

$$|Z_{15}| < 0.5\lambda, \qquad \text{d}$$

where $\lambda$ represents wavelength, and $Z_8$ is an eighth one of coefficients of a zernike fringe polynomial for wave aberration and represents a third-order spherical aberration and $Z_{15}$ is a fifteenth one of coefficients of the zernike fringe polynomial for wave aberration and represents a fifth-order spherical aberration.

An example of the condensing optical system includes a condensing optical system described for example in Japanese Patent No. 5444448.

Function

In the method for manufacturing a cutting tool according to the present embodiment, the step of producing and processing a flank face with a laser, as described above, by applying the above-described laser apparatus can be performed to manufacture a cutting tool having a cutting edge region which has no feed mark formed thereon and is also improved in linearity.

Furthermore, preferably, the producing and processing the flank face with the laser further includes finishing the cutting edge region with a second laser beam having a depth of focus shallower than the depth of focus of the first laser beam. The second laser beam having a depth of focus shallower than that of the first laser beam can process exactly a portion of the cutting edge region that is required to be processed to obtain a desired surface roughness. A cutting tool having a cutting edge region further smaller in surface roughness can thus be obtained. The second laser beam preferably has a depth of focus having a depth for example of 0.05 mm or more and less than 0.5 mm, more preferably 0.1 mm or more and less than 0.2 mm. The second laser beam can be prepared by a conventionally known laser apparatus.

The fact that the cutting tool obtained in the method for manufacturing a cutting tool has a cutting edge region with no feed mark formed thereon can be confirmed in the following observation method using a laser microscope. That is, whether any feed mark is present or absent can be confirmed by observing with a laser microscope (manufactured by Leica) at a magnification of 10 times the cutting edge region on the flank face of the cutting tool obtained in the above-described manufacturing method. For evaluating whether any feed mark is present or absent, one cutting tool has the cutting edge region observed in five fields of view arbitrarily selected thereon, and only when it is confirmed that there is no feed mark in any of the fields of view, it can be determined that there is no feed mark formed in the cutting edge region on the flank face of the cutting tool.

The cutting edge region of the cutting tool can be evaluated in linearity in the following method. Initially, the above manufacturing method is employed to manufacture a cutting tool to obtain a sample used to evaluate a cutting edge region in linearity. A contour shape measuring instrument (a contracer, trade name: "PF60," manufactured by Mitaka Kohki Co., Ltd.) is used to measure the sample with a resolution of 0.1 µm from point A serving as one end of the cutting edge region (that is, point A away from the ridge line of the edge on the side of the flank face by distance X) across the ridge line of the edge to a point on the rake face away from the ridge line of the edge by 100 µm. This provides a drawing of points with a pitch of 0.1 µm on the sample from the cutting edge region across the ridge line of the edge to reach the rake face.

Further, analysis software (trade name: "MitakaMap" manufactured by Mitaka Kohki Co., is applied to the drawing of points to select a point 10 µm away from the ridge line of the edge on the side of the flank face as a point S, and a straight line portion on the flank face is created based on a group of points from the selected point S to the ridge line of the edge. Similarly, in the drawing of points, a point 10 µm away from the ridge line of the edge on the side of the rake face is selected as a point T, and a straight line portion on the rake face is created based on a group of points from the selected point T to the ridge line of the edge. Then, the straight line portion on the flank face and the straight line portion on the rake face are extended to obtain an intersection line where these straight line portions intersect each other. Finally, by collating the intersection line with the drawing of points, it is checked whether the portion of the ridge line of the edge of the drawing of points matches the intersection portion of the intersection line, or if the former does not match the latter, a distance therebetween is determined. In the present embodiment, when there is a distance within 1 µm between the portion of the ridge line of the edge in the drawing of points and the intersection portion of the intersection line, the edge will have a ridge having a ridge line with a radius of curvature of 1 µm or less, and it can be determined that in this case the cutting edge region is improved in linearity. In other words, it can be determined that the cutting edge region is improved in linearity only when a round shape which appears when the ridge line of the ridge of the edge is observed in an enlarged view has a radius of curvature of 1 µm or less. When the portion of the ridge line of the edge of the drawing of points matches the intersection portion of the intersection line, there is a distance of zero (0) therebetween, and the edge has a ridge having a ridge line with a radius of curvature of 1 µm or less.

Nanopolycrystalline Diamond Tool

A cutting tool obtained through the method for manufacturing a cutting tool is preferably a nano-polycrystalline diamond tool. That is, the above manufacturing method is preferably a method for manufacturing a cutting tool for manufacturing a nano-polycrystalline diamond tool. Nano-polycrystalline diamond refers to polycrystalline diamond containing a plurality of diamond crystal grains having a nano-order grain size. Thus, a nano-polycrystalline diamond cutting tool can be manufactured having a cutting edge region which has no feed mark formed thereon and is also improved in linearity. In the present specification, a "nano-polycrystalline diamond tool" may be an embodiment of a cutting tool made of nano-polycrystalline diamond, or may be an embodiment of a cutting tool having a core portion made of cemented carbide or the like and an edge portion made of nano-polycrystalline diamond held on the core portion by means of brazing or the like.

Single-Crystal Diamond Tool

A cutting tool obtained through the method for manufacturing a cutting tool is preferably a single-crystal diamond tool. That is, the above manufacturing method is preferably a method for manufacturing a cutting tool for manufacturing a single-crystal diamond tool. Thus, a single-crystal diamond cutting tool can be manufactured having a cutting edge region which has no feed mark formed thereon and is also improved in linearity. In the present specification, a "single-crystal diamond tool" may be an embodiment of a cutting tool made of single-crystal diamond, or may be an embodiment of a cutting tool having a core portion made of cemented carbide or the like and an edge portion made of single-crystal diamond held on the core portion by means of brazing or the like.

Binderless cBN Tool

A cutting tool obtained through the method for manufacturing a cutting tool is preferably a binderless cBN tool. That is, the above manufacturing method is preferably a method for manufacturing a cutting tool for manufacturing a binderless cBN tool. Binderless cBN (BLCBN) refers to a cBN polycrystal in which cBN grains are bound together without any binder (or binding material) applied therebetween. BLCBN can be obtained by sintering cBN as a starting material at a predetermined high temperature under a high pressure without using a binder. Thus, a binderless cBN cutting tool can be manufactured having a cutting edge region which has no feed mark formed thereon and is also improved in linearity. In the present specification, a "binderless cBN tool" may be an embodiment of a cutting tool made of binderless cBN, or may be an embodiment of a cutting tool having a core portion made of cemented carbide or the like and an edge portion made of binderless cBN held on the core portion by means of brazing or the like.

Cutting Tool

A cutting tool according to the present embodiment is a cutting tool having a rake face, a flank face, and an edge having a ridge line interconnecting the rake face and the flank face, wherein on the flank face there is a cutting edge region from a boundary with the ridge line of the edge to point A away therefrom on the side of the flank face by distance X. Distance X is 0.2 mm or more and 5 mm or less, the cutting edge region has a surface roughness, as represented by arithmetic mean roughness Ra, of 0.2 µm or less, and the ridge line of the edge is free of chipping of 5 µm or more in size. The cutting tool that has such a feature has a cutting edge region which has no feed mark formed thereon and is also improved in linearity, and the cutting tool is thus suitable for mirror-finishing.

The method for manufacturing the cutting tool should not be limited insofar as the cutting tool has a cutting edge region having a surface roughness, as represented by arithmetic mean roughness Ra, of 0.2 µm or less and has an edge having a ridge line free of chipping of 5 µm or more in size. However, using the above-described method for manufacturing a cutting tool is preferable because a cutting tool which has a cutting edge region and an edge having a ridge line that have the above-described features can be obtained at a high yield. In the present specification, the terms "a cutting edge region on a flank face" and "an edge portion" used to describe the cutting tool are defined as specified in the [Method for Manufacturing a Cutting Tool] section.

Arithmetic Mean Roughness Ra

The cutting tool according to the present embodiment has a cutting edge region with a surface roughness, as represented by arithmetic mean roughness Ra, of 0.2 μm or less. This reveals that no feed mark is formed on the cutting edge region. The cutting tool preferably has the cutting edge region with a surface roughness, as represented by arithmetic mean roughness Ra, of 0.1 μm or less, more preferably 0.05 μm or less. Although the lower limit value for the surface roughness, as represented by arithmetic mean roughness Ra, of the cutting edge region should not be specifically defined, it can be 0.003 μm.

The surface roughness, as represented by arithmetic mean roughness Ra, in the cutting edge region can be determined in accordance with JIS B 0601 (2001). Specifically, the surface roughness can be determined by applying a laser-type surface roughness measuring instrument (trade name: "OLS4500" manufactured by Olympus Corporation) to the cutting edge region.

Count of Chipping

The cutting tool according to the present embodiment has an edge with a ridge line free of chipping of 5 μm or more in size. The cutting tool according to the present embodiment is thus suitable for mirror finish. The cutting tool preferably has an edge with a ridge line free of chipping of 2 μm or more in size, The fact that the cutting tool has an edge with a ridge line free of chipping of 5 μm or more in size can be confirmed by observing the ridge line of the edge with an optical microscope at a magnification of 500 times, Specifically, for chipping (or recess) on the ridge line of the edge as observed as described above with an optical microscope, a maximum amount of chipping from the ridge line of the edge toward the flank face is measured. Similarly, a maximum amount of chipping from the ridge line of the edge toward the rake face is also measured. In these measurements, whether chipping (or recess) on the ridge line of the edge does not exceed 5 μm in either a direction toward the flank face or a direction toward the rake face is verified. Thus, it can be confirmed that the cutting tool has an edge with a ridge line free of chipping of 5 μm or more in size.

Additional Notes

The above description includes embodiments additionally noted below.

A method for manufacturing a cutting tool having a rake face, a flank face, and an edge having a ridge line interconnecting the rake face and the flank face, wherein on the flank face there is a cutting edge region from the ridge line of the edge to a point A away therefrom on the side of the flank face by a distance X, the method comprising producing and processing the flank face with a laser, the producing and processing being producing and processing the cutting edge region along the ridge line of the edge with a first laser beam having a depth of focus equal to or larger than a width of the cutting edge region when the distance X is the width of the cutting edge region, the distance X being 0.2 mm or more and 5 mm or less.

EXAMPLES

Hereinafter, the present disclosure will more specifically be described with reference to examples although the present disclosure is not limited thereto.

Example 1

Preparing a Cutting Tool Precursor

Initially, a cutting tool precursor which undergoes the step of producing and processing a flank face with a laser is prepared. As such a cutting tool precursor, a cutting tool precursor in which CVD single-crystal diamond obtained in a conventionally known method is applied as an edge portion is prepared. Specifically, the cutting tool precursor is produced by brazing CVD single-crystal diamond as an edge portion to a core portion made of cemented carbide, and thus holding the CND single-crystal diamond. The cutting tool precursor at the edge portion made of CVD single-crystal diamond has a rake face, a flank face, and an edge having a ridge line interconnecting the rake face and the flank face, and on the flank face there is a cutting edge region having a width from the ridge line of the edge to a point A away therefrom on the side of the flank face by a distance X of 1 mm.

Preparing a Laser Apparatus

Subsequently, a laser apparatus used in the step of producing and processing a flank face with a laser is prepared. As such a laser apparatus, a laser apparatus including a laser resonator having YVO4 as a laser medium and an optical component that forms an interference laser beam as a first laser beam from a laser beam emitted from the laser resonator is prepared. The optical component includes a diffractive optical element and a convex lens as shown in FIG. 2, and forms an interference laser beam in which first-order light and second-order light coaxially overlap and interfere with each other. The interference laser beam (or the first laser beam) has a depth of focus having a depth of 2 mm as a size reaching from the first focal plane to the second focal plane through the third focal plane.

Producing and Processing Flank Face with Laser

By applying the above laser apparatus, the cutting tool precursor is processed to produce along the ridge line of the edge a cutting edge region having a width of 1 mm on the flank face. In this step, the first laser is emitted under the following conditions:

Conditions for Emitting the First Laser

Wavelength: 532 nm
Output: 10 W
Pulse width: 50 nsec

Thus, a cutting tool according to Example 1 using CVD single-crystal diamond as an edge portion on a core portion made of cemented carbide (a single-crystal diamond tool) is manufactured.

Comparative Example 1

A cutting tool according to Comparative Example 1 (a single-crystal diamond tool) was produced through the same process as Example 1 except that, in the step of producing and processing the flank face with a laser, the cutting tool precursor was processed with a laser beam having a depth of focus having a depth of 0.1 mm to produce and process a cutting edge region.

Various Evaluations

Presence or Absence of Feed Mark

With respect to the cutting edge regions of the cutting tools according to Example 1 and Comparative Example 1, whether a feed mark is present or absent is evaluated using the above-described method. As a result, no feed mark was observed on the cutting edge region of the cutting tool of Example 1, whereas feed marks were observed with a pitch of 30 μm on the cutting edge region of the cutting tool of Comparative Example 1 (see encircled portion Y in FIG. 1).

Linearity of Cutting Edge Region

The cutting edge regions of the cutting tools according to Example 1 and Comparative Example 1 are evaluated for linearity using the above-described method. As a result, the cutting tool of Example 1 in a drawing of points has the portion of the ridge line of the edge matching the intersection portion of the intersection line, and can thus be evaluated as having a cutting edge region improved in linearity. On the other hand, it has been confirmed that the cutting tool of Comparative Example 1 has a cutting edge region with an edge having a round shape with a radius of curvature exceeding 1 μm (see encircled portion X in FIG. 1).

Arithmetic Mean Roughness Ra

With respect to the cutting edge regions of the cutting tools according to Example 1 and Comparative Example 1, surface roughness as represented by arithmetic mean roughness Ra is determined using the method described above. As a result, the cutting tool of Example 1 had a surface roughness (Ra) of 0.1 μm, whereas the cutting tool of Comparative Example 1 had a surface roughness (Ra) of 0.3 μm.

Count of Chipping

With respect to the ridge lines of the edges of the cutting tools according to Example 1 and Comparative Example 1, whether chipping of 5 μm or more in size is present or absent is determined using the above-described method. As a result, it has been confirmed that the cutting tool of Example 1 did not have chipping of the above size, whereas the cutting tool of Comparative Example 1 had chipping of the above size at three locations.

Discussions

From the above, it is understood that the cutting tool of Example 1 manufactured using a first laser beam having a depth of focus having a depth of 2 mm has a cutting edge region which has no feed mark formed thereon and is also improved in linearity as compared with the cutting tool of Comparative Example 1. Further, the cutting tool of Example 1 has the cutting edge region with a surface roughness, as represented by arithmetic mean roughness Ra, of 0.1 μm or less, and has an edge with a ridge line free of chipping of 5 μm or more in size, and it is understood that when the cutting tool of Example 1 is compared with the cutting tool of Comparative Example 1, the former is superior to the latter in both surface roughness in the cutting edge region and count of chipping on the ridge line of the edge.

Thus while embodiments and examples of the present disclosure have been described, it is also initially planned to combine configurations of the embodiments and examples, as appropriate.

The presently disclosed embodiments and examples are illustrative in any respects and should not be construed as being restrictive. The scope of the present invention is defined by the scope of the claims, rather than the embodiments and the examples described above, and is intended to include any modifications within the scope and meaning equivalent to the scope of the claims.

REFERENCE SIGNS LIST

X, Y encircled portion, 1 optical component, 2 diffractive optical element, 3 convex lens, 4 laser resonator, 5 focal plane, 6 first-order light, 7 second-order light, 8 Fθ lens, 9 aspherical phase plate, 10 condensing optical system, 11 galvano-mirror, 12 galvano-scanner, P1 first focal plane, P2 second focal plane, P3 third focal plane.

The invention claimed is:

1. A cutting tool having a rake face, a flank face, and an edge having a ridge line interconnecting the rake face and the flank face, wherein on the flank face there is a cutting edge region from the ridge line of the edge to a point away therefrom on the side of the flank face by a distance X,
   the distance X being 0.2 mm or more and 5 mm or less,
   the cutting edge region having a surface roughness, as represented by an arithmetic mean roughness Ra, of 0.2 μm or less,
   the edge having the ridge line without recesses therein of 5 μm or more in size, wherein
   a ridge of the edge having the ridge line has a radius of curvature of 1 μm or less,
   the material of the cutting tool is nano-polycrystalline diamond, single-crystal diamond, or binderless cBN, and
   the cutting edge region on the flank face has no feed marks thereon when observed in multiple fields of view thereon with a laser microscope at a magnification of 10 times the cutting edge region on the flank face.

* * * * *